United States Patent [19]

Brunner

[11] Patent Number: 5,021,674
[45] Date of Patent: Jun. 4, 1991

[54] PROCESS FOR DETERMINING THE LOCATION OF EDGES AND PHOTOELECTRONIC SCANNING DEVICE FOR SCANNING EDGES

[75] Inventor: Gerhard Brunner, Augsburg, Fed. Rep. of Germany

[73] Assignee: Erhardt & Leimer GmbH, Augsburg, Fed. Rep. of Germany

[21] Appl. No.: 465,721

[22] Filed: Jan. 16, 1990

[30] Foreign Application Priority Data

Jan. 14, 1989 [DE] Fed. Rep. of Germany ....... 3900928

[51] Int. Cl.⁵ .......................................... G01N 21/86
[52] U.S. Cl. .................................... 250/561; 250/548
[58] Field of Search ............... 250/560, 561, 548, 557; 356/383, 384, 385, 386, 387

[56] References Cited

U.S. PATENT DOCUMENTS

| | | | |
|---|---|---|---|
| 3,327,125 | 6/1967 | Herchenroeder | 250/233 |
| 3,619,626 | 11/1971 | Rudolph | 356/387 |
| 4,041,321 | 8/1977 | Linard | 250/560 |
| 4,559,452 | 12/1985 | Igaki et al. | 356/386 |
| 4,773,029 | 9/1988 | Claesson et al. | 250/359.1 |

FOREIGN PATENT DOCUMENTS

| | | |
|---|---|---|
| 1255325 | 11/1967 | Fed. Rep. of Germany . |
| 3423308 | 6/1986 | Fed. Rep. of Germany . |
| 3900928 | 6/1990 | Fed. Rep. of Germany . |
| 1298145 | 11/1972 | United Kingdom . |

Primary Examiner—David C. Nelms
Attorney, Agent, or Firm—Herbert Dubno

[57] ABSTRACT

A process and device for determining the location of at least one edge of a moving web within a measurement zone and in which a linear array of liquid crystal light modulators is interposed between a light source and a light receiver extending transversely to the edge along a scanning zone while a controller successively activates the light modulators to scan a transparent surface zone along the measurement zone. The point at which light is last received (because of obstruction by the edge) or the first received in a pass (because of lack of obstruction by the edge) at the receiver from the source through the scanning transparent zone is used as the measure of the location of the edge.

21 Claims, 2 Drawing Sheets

PROCESS FOR DETERMINING THE LOCATION OF EDGES AND PHOTOELECTRONIC SCANNING DEVICE FOR SCANNING EDGES

FIELD OF THE INVENTION

The present invention relates to a process for determining the location of at least one edge of a material web extending transversely to the direction of movement, in which the web partially covers a light source directed toward a light-collecting receiver and in which at least one signal is evaluated with respect to the location of the light-dark boundary in the measurement zone by means of at least one photocell as a function of the reception light.

The invention also relates to a photoelectronic scanning device for carrying out this process comprising at least one light source that is located at right angles to the direction of travel of the web and illuminates a scanning zone partially covered by the material web, and at least one light-collecting receiver unit aligned therewith, which extends over the scanning zone and has at least one light entry surface and at least one light exit surface, on which at least one photocell is arranged that can be activated by light to generate a signal.

BACKGROUND OF THE INVENTION

In processes of this class (West German Patent Specification No. 3,423,308), some of a series of photocells arranged along the measurement zone at one or several light-collecting bodies are activated, while the others remain passive. The location of the light/dark boundary and consequently the edge of the material web can be determined by polling the signals generated by the photocells. The polling and processing of the signals of the photocells requires highly expensive control means even in a digital scanning mode. The accuracy of determination of the location of the edge is not satisfactory, especially in the case of high-speed material webs performing rapid transverse movements. In addition, measurement over a width zone is expensive if measurement is to be possible over rather great widths.

OBJECT OF THE INVENTION

The basic object of the present invention is to provide a process of the type described, as well as a scanning device for carrying out the process, which process and device make it possible to increase the accuracy of the measurement and to make simple adjustments for material webs of different widths.

SUMMARY OF THE INVENTION

The task stated is accomplished according to the present invention in that at least one transparent surface zone of a linear array of liquid crystal light modulators, which array is nontransparent to light, with the exception of the surface zone, is moved stepwise over the measurement zone in the path of rays between the light source and the receiver, that the signal is generated when a light beam traveling along with the surface zone falls on the receiver for the first time and for the last time at the edge of the material web, and that the location of the surface zone within the measurement zone at the instant of the signal is determined and is taken as the location of the edge.

The basic principle of this process is to generate a relative movement in the direction of measurement between at least one light beam and the receiver, to generate the signal representing the light/dark boundary with the light beam, and to determine the location of the edge of the material web at the time of the signal on the basis of the location of the surface zone of the linear array of liquid crystal light modulators, which surface zone is transparent to the light beam.

In other words, the location of the edge of the material web rather than the location of the light/dark boundary at the receiver part is determined indirectly from the location of the transparent surface zone at the time of the signal.

Because the location of the transparent surface zone of the linear array of liquid crystal light modulators is known on the basis of the drive of the linear array during the movement and consequently also at the time of the signal, a relationship between the signals of the photocell and the location of the surface zone can be established simply and accurately.

If the movement of the surface zone is cyclic, the location of the edge and movements of the edge are determined accurately, and clearly distinguishable signals will appear, which are highly suitable for controlling the material web. There will be a high accuracy of scanning, because the resolution of the measurement range can be very high. The high accuracy of scanning is desirable mainly at high speeds of web travel.

It is possible to use a digital scanning mode as well as an analog scanning mode, and the digital scanning mode offers the application-related advantage of being insensitive to fluctuations in light, e.g. to a decrease in the brightness of the light source or contamination of the optical system, because only a minimal signal threshold voltage is further processed.

By contrast, the analog scanning mode has the advantage of requiring a less expensive electronic system and being more rapid and accurate. The two scanning possibilities can also be combined with one another as desired.

In the case of the digital scanning mode, the measured data can be further processed with a computer, almost without limitations. Extremely large measuring zones (broad band scanning) are possible with both process variants, and the desired measurement zone can be set in a simple manner.

It is also possible to move the measurement zone to and fro cyclically in order to vary the path of movement of the web systematically, which is useful for certain winding processes. It is also possible to move the web without problems, because the liquid crystal light modulators, which are the dominant active element of the process, create a plurality of possibilities in terms of drive that are particularly suitable for this process.

Advantageously the transparent surface zone is moved through the measurement zone considerably more rapidly than the edge of the material web during its transverse movements. This is useful for the accuracy of scanning. The edge is imaged accurately with the traveling surface zone of the array of liquid crystal light modulators in the case of a high cycle speed, because a high cycle rate permits a large number of measurement runs at the edge of the material web, so that the correction signals can be generated systematically when the web moves beyond the tolerance limits and can again be gradually reduced via the edge scanning when the correction comes into action.

The passage of the surface zone can be simulated by the stepwise successive electronic activation of the surface zones of a series of surface zones arranged along the measurement range in the linear array of liquid crystal light modulators. This is highly advantageous, because a kind of traveling aperture, which moves the light beam for the receiver over the measurement range, is produced by the successive electronic activation of the surface zones.

The surface zone is usually moved in one direction in cyclic runs, at a very high velocity and high cycle rate, which can be easily realized in terms of control for liquid crystal displays. Because the location of the activated surface zone is available at any time as an electronically usable signal due to the drive of the liquid crystal display, this signal can be linked with the signal of the photocell or photocells in a very simple manner and practically without delay.

A measurement zone can be delimited within the scanning zone and the surface zone within the scanning zone is moved only over the measurement zone.

This is also important because high cycle rates and accurate scanning of the transverse movements of the edge are possible in a limited measurement zone. The scanning zone in which scanning is possible is not limited in itself. However, limitation of the measurement zone, which is advantageously carried out only after the end of the start-up phase, ensures that scanning is performed only exactly in this zone, in which the edge of the material web can move, and that accurate and intense signals will be available for this measurement zone. Adjustment to different edge locations is just as possible as adjustment to different web widths or web travel speeds.

Changing the path of the material web can also be set by a cyclic displacement of the measurement zone, and the correct location of the material web can be determined and controlled during the changing.

Advantageously in order to initially locate the edge, the surface zone of the linear array of liquid crystal light modulators is scanned over the entire scanning zone, and the measurement zone is switched over to a narrower measurement zone related to the nominal location of the edge in order to subsequently determine the location of the edge within the scanning zone.

It is unimportant during the start-up phase that the cycle rate of scanning is lower for the length of the material web passing through, because the edge is first sought and the nominal location of the edge is set only thereafter. Due to the fact that the measurement range is subsequently narrowed down to the nominal location, the length of material web passing through is scanned more frequently at high cycle rate, and the measurement cycles will be more rapid.

The process with measurement of the quantity of light is important in that at least the width of the surface zones of the linear array of liquid crystal light modulators as seen in the direction of movement of the material web be adjustable, and that the surface zones can be adjusted from a narrow setting during the initial edge locating run to a broader setting for the measurement zone, whose length is limited.

Until the setting to the nominal location of the edge is accomplished and in order to set the measurement zone actually swept, the operation is carried out with surface zones that are narrow in the direction of travel of the material web in order to obtain favorable signals for the edge locating run. The surface zone is subsequently broadened, so that signals of optimal intensity will again be obtained for working in the narrowed measurement zone. The narrowest surface zone is always preferable in the digital scanning mode.

It has been formed to be advantageous that the signal is evaluated optionally as a digital or analog signal and that in the digital scanning mode, the signals generated by the photocell are formed as voltage values exceeding a minimum threshold voltage, whereas in the analog scanning mode, the signals are formed as voltage values representing the measured quantity of light because either the digital or the analog scanning mode produces usable results, depending on the intended purpose, combination of the modes and switching from one mode to the other is also possible as desired.

Photoelectronic scanning devices for carrying out the prior-art processes mentioned in the introduction had the disadvantage of being relatively inaccurate, sensitive to use, and unsuitable for width measurement. In particular, they lacked the wide width response range.

According to the apparatus aspect of the invention, in that a band-shaped linear array of liquid crystal light modulators is arranged between the light source and the receiver unit, that in the direction of measurement, the liquid crystal light modulators have at least one series of surface zones that can be electronically activated from a nontransparent normal state into a transparent state, and that the surface zones are connected to a control circuit for sequential activation.

This photoelectronic scanning device permits the location of the edge to be determined with extremely high accuracy, it is insensitive to contamination, and it can also be readily used for the width measurement of the material web. The surface zones of the liquid crystal light modulators have, for example, a bar-shaped structure, similar to the usual bar displays, and are scanned so that one of all the surface zones present is always transparent to light and one shifts from one surface zone to the next in a staggered pattern. A moving aperture, which permits one light beam or one bundle of light to travel along on the receiver, is thus formed for the light-collecting receiver. The signal changes at the edge of the web, which is used by the photocell or photocells at the receiver for generating a signal.

However, due to the drive of the liquid crystal light modulators, the location of the surface zone that happens to be transparent to the light is known at the time of the signal, so that the exact location of the edge of the material web is known at the same time due to the photocell signal indicating the light/dark or dark/light boundary. Due to the high resolution of the liquid crystal light modulators, the location of the material web can be scanned with extraordinarily high accuracy, even in the case of high web travel speed and relatively great transverse movements of the web.

There will be relatively short run times for the surface zone of the liquid crystal light modulators and consequently short scanning cycles, from which the very high accuracy of scanning, reached even at high web travel velocities because of the elegant manner in which the signals are further processed with computerized control devices, is favorable. For example, fluctuations in light are irrelevant, because only a minimal signal threshold voltage is subjected to further processing anyway.

Higher scanning speed and further increased accuracy are reached with the analog scanning mode. Regardless of the scanning mode, it is possible —— based on the capacity of the liquid crystal light modulators —— to create a broad-band scanning device which can, but does not have to, have a very large measurement zone, which is larger than the measurement zone of 8-30 mm that is commonly used in edge-bound scanning devices, but still maintains such a high accuracy of measurement. Such a broad-band scanning device also has the advantage that it does not have to be set to the actual material web width, because it already covers all the possible variations in width.

The useful scanning zone can be very large. However, this would require long run times for the activated surface zone and the needless scanning of a broad zone when working with the scanning device. Due to the ease with which the liquid crystal light modulators can be driven, which is adjustable in terms of changes in the velocity of travel, in the number of surface zones activated during each run, and in the location of the surface zones within the longitudinal extension of the liquid crystal light modulators, it is possible to make all the changes in the process that are useful in practice, i.e. to carry out scanning over a broad zone, a very narrow zone, to change the location of the narrow measurement zone within the entire scanning width, and even to cyclically shift the measurement range adjusted to a defined width in order to change the path of travel of the moving web.

The control circuit is connected to a determining circuit in which the location of an activated surface zone within the measurement zone can be determined with a signal of the photocell. The construction is advantageous because the determining circuit exactly determines the location of the activated surface zone and consequently the edge of the material web at the time of the signal. The accuracy of the scanning device is extremely high, because the resolution of the liquid crystal light modulators can be very high.

The array of liquid crystal light modulators is advantageously band-shaped and each surface zone that can be activated is at least one pixel of the liquid crystal light modulators. This is of great significance for ensuring a scanning zone of optimal width with a broad range of variation of the measurement zone in crowded spaces.

The liquid crystal light modulators require only a small width in the direction of travel of the material web, while it (the web) can extend in one piece practically over the scanning zone. Reliable scanning results can be obtained even when only one pixel or light spot of this array passes through periodically. However, a larger quantity of light per unit of time and consequently perhaps a signal of higher intensity can be generated if the activated surface zone of the array consists of a plurality of pixels. Only one pixel is preferably used as the display in the digital scanning mode, because a small quantity of light is sufficient for the detection, and the narrower the slot-shaped segment, the higher are the resolution and accuracy of the measurement.

Having zones in the field of vision of the liquid crystal light modulators are bar-shaped, rectangular or round segments has proved to be particularly successful in practice, and the most favorable signal values were obtained with bar-shaped and rectangular segments if the analog scanning mode was used. In the digital scanning mode, it is best to use narrow, band-shaped segments.

The measurement zone can be limited to any dimension and to any location within the possible scanning zone via the drive of the liquid crystal light modulator, and it is definitely possible to set a different measurement zone during the start-up phase than during the phase of operation. The measurement zone can also be changed easily during the operation.

Preferably the location of the measurement zone within the scanning zone is adjustable cyclically. This is advantageous for (systematically) varying the path of the material web.

The device can be switched over to the digital or analog scanning mode as desired. The possibility of switching over makes the scanning device universally usable for all applications that occur in practice.

The light source can be a broad-band light source at one side of the material web and the receiver can be a body made of light-collecting plastic painted with a fluorescent paint or a band-shaped parabolic mirror at the other side of the material web. Bodies made of light-collecting plastic, as well as a band-shaped parabolic mirror have the advantage that light entering through the light-entry surface is concentrated on its way to the light exit-surface, so that it is ensured with only one photocell or with only a few photocells that a distinct and accurate signal is generated as soon as a major change in the intensity of light occurs at the light/dark boundary, which is determined by the material web and the location of its edges.

Even though the parabolic mirror does require a certain depth and consequently a certain overall height, it represents a simple means for collecting light over a relatively large scanning or measurement zone. The body made of light-collecting plastic can be made very flat, so that a very compact design will be obtained. To keep energy losses as low as possible, the parts of the light-exit surface that are not needed are covered or metal-coated. The light source, which is, e.g., a broad-band lamp or a fluorescent lamp, can be covered with a dust cover and be provided with a light grating or a lens strip for producing parallel light, as are commonly used to obtain collimated light.

The liquid crystal light modulators can be placed on the body or on the entry opening of the parabolic mirror. This is advantageous because the array of liquid crystal light modulators is used as a cover for the light-entry surface of the receiver, which reduces the sensitivity to foreign light or avoids unnecessary losses of light. In addition, this embodiment is very correct.

A plurality of photocells can be arranged at spaced locations over the scanning zone and are arranged on the light-exit surface of the body. This is important especially for the analog scanning mode. However, using a plurality of photocells, e.g., photodiodes spaced ca. 50 cm apart, to compensate for light conduction losses in the body made of light-collecting plastic can be useful in the case of digital scanning as well. If the light-collecting receiver has a sufficiently high performance, one photocell, e.g., one photodiode, which should be positioned in the middle of the scanning zone or measurement zone, may well be sufficient in the digital scanning mode. Light conduction losses in the light-collecting element do not play such a great role in the digital mode.

The speed of succession and/or the number of activation cycles of said surface zones, as seen in the direction of measurement, can be adjustable. This is useful for adjustment to different web travel velocities or to the intensity of the transverse movements of the web. The scanning device is adjusted t the actual conditions in a simple manner here, via the drive of the liquid crystal light modulators. Driving is always set at the highest cycle rate in the digital scanning mode.

The determining circuit is connected to a web travel-correction device for transmitted signals. This is important because the signals processed can be used directly for running the material web through the correction device.

BRIEF DESCRIPTION OF THE DRAWING

The above and other objects, features and advantages of the present invention will become more readily apparent from the following description, reference being made to the accompanying drawing in which.

DETAILED DESCRIPTION

Figure 1:
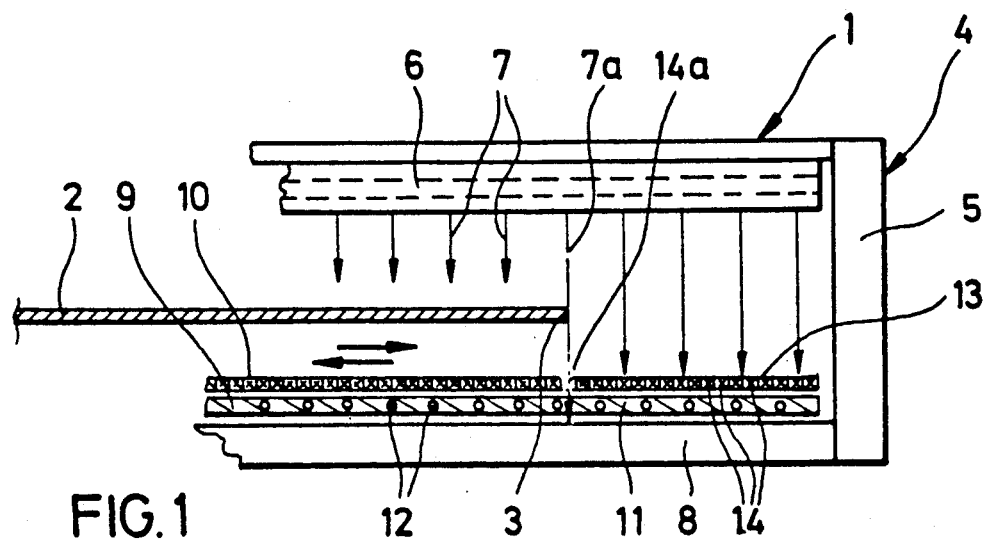
FIG. 1 is side elevational view, partly in section, which shows part of a photoelectronic scanning device in a view in the direction of travel of the material web.

A rectangular frame 4, which contains a broad-band light source 6 on vertical frame sections 5 on the top side of the material web 2, is provided in a photoelectronic scanning device 1 for scanning an edge 3 of a moving material web 2. The light source 6 emits a curtain of light beams 7, which is directed toward a receiver 9 arranged on a lower crossbeam 8 of the frame. The receiver 9 is a plate-shaped body 11 made of a fluorescent plastic possessing light-collecting properties. The light-collecting plastic is described in Specification KL 47310 of 1 March 1981 of Bayer AG. A band-shaped array of liquid crystal light modulators 10 is arranged in front of the receiver 9 in the path of rays between the light source 6 and the receiver 9. The array 10 is preferably placed on the light-entry surface of the receiver 9.

The receiver 9 is equipped with at least one photocell 12, preferably a photodiode, on its light-exit surface. In the embodiment shown, a plurality of photocells 12 are provided at uniformly-spaced locations from one another to compensate for light conduction losses within the receiver 9. The liquid crystal light modulators 10 have a top field of vision and a plurality of surface zones 14 that are separated from one another and are arranged at right angles to the direction of travel of the material web. Activated by a control circuit (not shown), the surface zone being activated, e.g., 14a, becomes transparent to light, while the surface zones not activated remain nontransparent to light. A moving aperture for the light beam 7 is thus created during the successive activation of each of the surface zones 14; this activation moves from right to left in FIG. 1.

During the passage from right to left in FIG. 1, the light beam 7, passing through the surface zone 14a that is transparent to light, falls on the receiver 9, until a light beam 7a finally arrives at said receiver 9 for the last time in the surface zone 14a.

During the further course of the run of the liquid crystal light modulators 10, no light beam 7 will arrive at the receiver 9 any longer, being screened by the web 2. Thus, a signal is generated with the light beam 7a by one of the photocells 12 or by all the photocells 12. Because the location of the last light-conducting surface zone 14a at the time of the signal is known, the location of the edge 3 can be exactly determined. The liquid crystal modulators 10 are preferably scanned with a high cycle rate and always in the same direction of movement, so that accurate information is always obtained on the location of the edge 3.

It is, of course, also possible to select a direction of movement from left to right in FIG. 1, in which case light would first fall on said receiver 9 at the edge 3, so that one photocell or a plurality of photocells would generate a signal, which would indicate the exact location of the edge 3 based on the location of the surface zone 14a.

It would also be possible to arrange the liquid crystal light modulators 10 on the side of the material 2 facing away from the light source 6. It would be sufficient to cyclically scan only one pixel or one light spot of this array 10. However, segments consisting of a plurality of pixels are preferably used in order to pass through a higher light output.

It would also be theoretically possible to operate according to the principle of reflection, i.e. to arrange the receiver 9 and the light source 6 on the same side of the material web 2. The reflected light of the light beams 7 can then be used to generate the signal.

Figure 2:
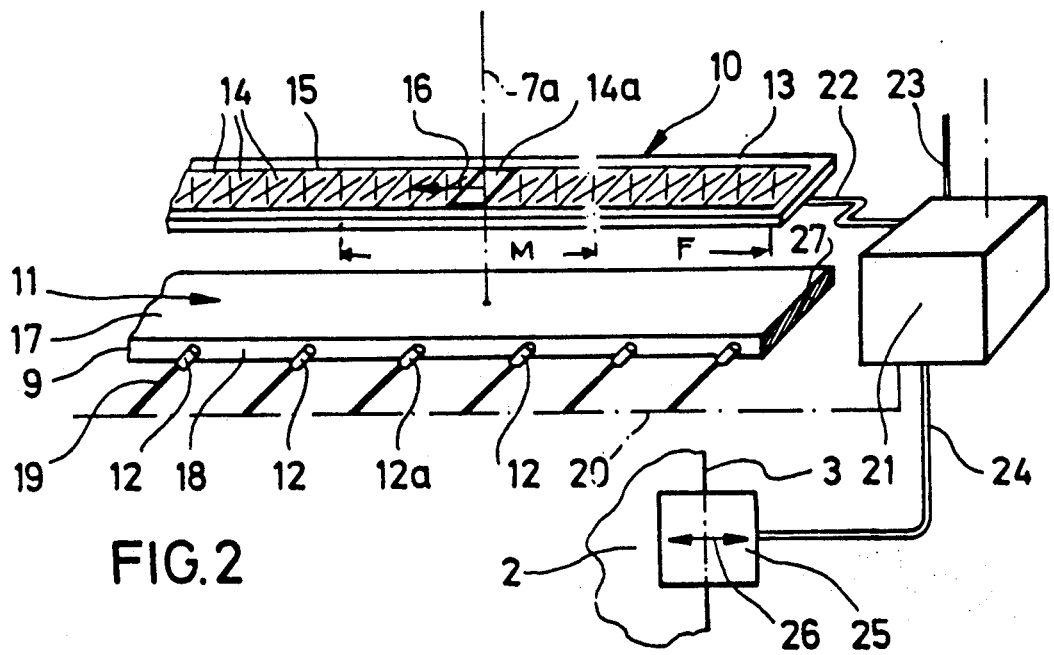
FIG. 2 shows a perspective view of part of the scanning device of FIG. 1.

FIG. 2 shows that the liquid crystal light modulators 10 have on their top side 13 a field of view 15 which consists of bar-shaped segments that are located adjacent to one another and define the surface zones 14. The surface zones 14 are scanned in the direction of arrow 16 so that one surface zone, e.g. 14a, becomes transparent to light, while the others remain nontransparent to light (indicated by an "x"). Thus, the impression of an aperture passing through in the direction of the arrow 16, which aperture permits one light beam, e.g. the beam 7a, to pass through in the direction of measurement, is created for the receiver 9.

The light beam 7a falls on the light-exit surface 17 of the light-collecting body 11; it is concentrated therein and is transported to its light-exit surface 18, where at leas one photocell 12a or a plurality of photocells 12 are arranged. The photocells 12 are connected via signal lines 19 to a bus line 20, which leads to a control unit 21. The control unit 21 contains a control circuit (not shown) for the liquid crystal light modulators 10 and is connected thereto via lines 22. The control unit 21 is connected via a line 23 to the power source and to further signal processing devices. An output line 24 can lead to a web travel-correction device 25, which corrects the web in the direction of a double arrow 26 and as a function of the signals received from the control unit 21.

FIG. 2 also shows that the scanning zone F of the scanning device 1 is unlimited in itself. However, the actual measurement zone M can be limited to any desired number of surface zones 14 of the liquid crystal light modulators 10 by means of the control circuit in the control unit 21. The measurement zone can be shifted in any direction and its width can be selected as desired; if necessary, it may be just as wide as the scanning zone F. Unused light exit surfaces of the light-collecting body 11 can be covered or provided with a metal-coated surface 27 for reflection in order to increase the efficiency of light collection and light conduction to the light-exit surface 18.

It is also possible to make the width of the surface zones 14 as seen in the direction of travel of the material web variable via the control circuit (not shown) of the liquid crystal light modulators 10, so that, for example, very small surface zones are scanned over the entire scanning zone F during the start-up phase (edge locating run) before the measurement zone M is set to the nominal location of the edge and to the range of transverse movement to be monitored and the entire width of said surface zones 14 is used for scanning.

Figure 3:
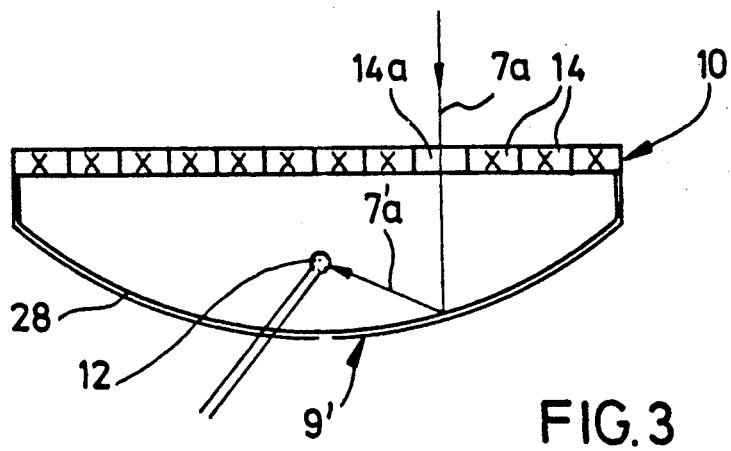
FIG. 3 shows part of another embodiment.

In the embodiment according to FIG. 3, a band-shaped parabolic mirror 28 is provided as the receiver 9', and at least one photocell 12 is arranged in its focus. A band-shaped array of liquid crystal light modulators 10, whose surface zones 14, 14a are scanned in the above-mentioned manner, is again arranged in the entry surface or in the entry area of the receiver 9', so that one light beam 7a enters the parabolic mirror 28 and is reflected from there to the focus (reflected light beam 7'a). In other words, each light beam 7a entering through the surface zone 14a just being activated is reflected to the focus and consequently to the photocell 12 over the scanning width defined by the length of the parabolic mirror 28. There will be no light beam at the edge 3, so that the photocell 12 will generate a signal, which is linked with the location of the activated surface zone 14a at the time of the signal in order to determine the exact location of the edge of the material web. The measurement zone actually selected can be adjusted in length and also in terms of its location within the parabolic mirror 28 by selecting the number of surface zones 14 to be scanned in this case as well.

Figure 4:
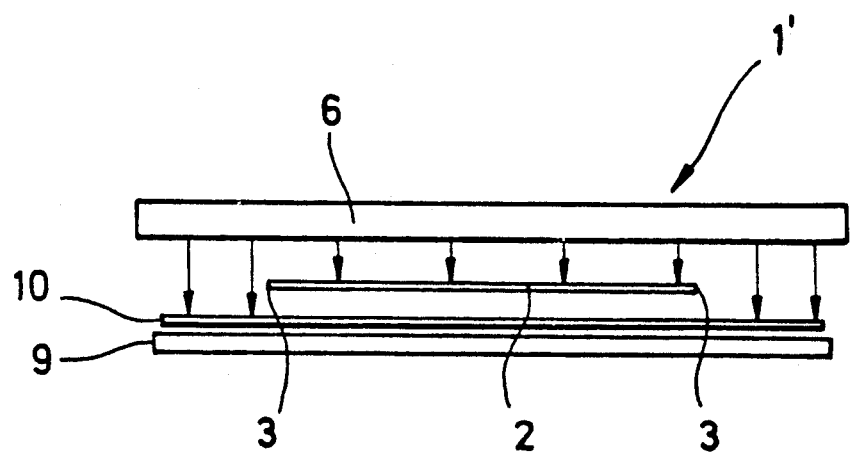
FIG. 4 shows a schematic view of a web width and web edge scanning device.

In the scanning device 1' according to FIG. 4, not only are the two edges 3 of the material web 2 scanned, but the overall width of the web is also determined, because both the light source 6 and the receiver 9 as well as the liquid crystal light modulators 10 extend over the entire width of the material web and beyond the edges 3.

By specifically selected driving of the light modulators 10, the material web 2 can be moved in a systematically changing pattern, i.e. the web is moved cyclically to and fro by means of the web correction or control device (25 in FIG. 2) in order to generate a predetermined rhythm for certain roll-winding processes. The scanning of the web edge and the correction of the path of the web can also be performed simultaneously or independently of this. It is also possible to scan a plurality of surface zones at the same time on the liquid crystal light modulators 10, i.e. to drive two or three surface zones with constant distance if the control unit is designated such that it is able to distinguish the signals generated at different times from one another.

If the measurement one actually traveled is set to an edge 3, only the border edge can be scanned in the above-mentioned manner. The rest of the area of the liquid crystal light modulators 10 remains continuously passive. It is then possible to achieve high cycle rates and accurate scanning. The lower crossbeam 8 of the frame (FIG. 1) can be designated as a U-shaped extruded profile made of plastic or aluminum, into which a unit consisting of the receiver 9 and the array 10 fastened to it is pushed. A similar housing unit can also be used for the light source 6, and a glass plate, serving as a dust cover, and a light grating or a lens strip, serving as a light-directing means, are preferably pushed in front of or are integrated within the light source 6.

Due to the limitation of the measurement range actually traveled, a steep scanner characteristic and a highly sensitive and accurate scanner signal free from foreign light will be obtained. The measurement range actually traveled can be substantially larger than the 8-30 mm of the prior-art scanning devices.

Manual adjustment of the scanning device to the actual web width is eliminated, because the liquid crystal light modulators 10 are universally adjustable due to their control device. In the case of a high-performance receiver 9 and digital signal evaluation, one photodiode arranged in the middle is sufficient. A series of photodiodes, spaced, e.g., at ca. 50 mm from one another, are advantageously used in the case of analog signal evaluation.

Scanning the array of liquid crystal detectors 10 over the entire scanning zone would lead to relatively long scanning cycles under certain circumstances. It is therefore an advantage to scan over the entire scanning zone only at the beginning of the edge scanning in a so-called edge locating run, until the location of the edge has been determined after a few scanning cycles.

A limited measurement zone is subsequently set in a narrow tolerance zone, e.g., 10-30 mm around the edge location determined, after which scanning is always performed in the same direction. The limited measurement zone can be preset in the electronic driving unit of the liquid crystal light modulators. It is also possible to position the liquid crystal light modulators by hand at the nominal edge location, e.g. by entering the desired edge location by hand on the electronic control unit or by an automatic edge locating run, in which the edge location is detected automatically and stored electronically. For this purpose, the control unit is equipped with a microprocessor or at least a memory in the control circuit.

In the analog scanning mode, scanning is switched over from initially very small surface zones to large surface zones after the edge locating run, and scanning is performed in the analog mode by measuring the quantity of light.

The nominal location of the edge can be changed by displacing the measurement zone of the liquid crystal light modulators. This is possible within the entire scanning zone.

Cyclic displacement of the predetermined measurement zone around a nominal location is also possible in order to systematically change the path of the web, which is useful, e.g. during the winding of a web. The signal can be evaluated according to the digital or the analog method. Switching from one mode to the other as desired is also conceivable. The advantages of digital signal evaluation are its insensitivity to fluctuations in light and the nearly unlimited further processing of the measured data in a computer. Even though interferences due to light fluctuations can occur in the case of analog signal evaluation, analog signal evaluation is generally faster and more accurate and requires a less sophisticated electronic system.

What is claimed is:

1. A process for determining a location of at least one edge of a moving web within a measurement zone extending transversely to a direction of movement of said web, said process comprising the steps of:
   (a) passing said web between a light source and a light-collecting receiver having at least one photocell so that said web partially intercepts light passing from said source in the direction of said receiver and said edge lies in said zone;
   (b) stepping at least one transparent surface zone of a linear array of liquid-crystal light modulators, which is nontransparent to light except for said surface zone and which is disposed between said source and said receiver, across said measurement zone;

(c) generating at least one signal when light traversing said transparent zone first falls on said receiver or falls on said receiver for a last time upon at said edge in each travel of said surface zone across said measurement zone; and (d) determining a location of said surface zone with said measurement zone at an instant of said signal as the location of said edge, thereby evaluating said signal with respect to a location of a light/dark boundary in said measurement zone.

2. The process defined in claim 1, further comprising the step of moving said transparent surface zone through said measurement zone substantially more rapidly than transverse movements of said web.

3. The process defined in claim 1, further comprising the step of simulating movement of said surface zone through said measurement zone by stepwise successive electronic activation of surface zones arranged along the measurement range in said linear array of liquid-crystal light modulators.

4. The process defined in claim 3 wherein said surface zones are cyclically activated always in the same direction.

5. The process defined in claim 1 wherein said measurement zone is a limited region delimited within a scanning zone over which said array extends, said surface zone being moved within said scanning zone only over said measurement zone.

6. The process defined in claim 5, further comprising the step of cyclically moving said measurement zone to and fro within said scanning zone.

7. A process defined in claim 1, further comprising the step of initially locating said edge by scanning said surface zone initially over an entire scanning zone of a length in excess of a shorter measurement zone, and thereafter limiting scanning of said surface zone to said shorter measurement zone over a narrow region of said scanning zone related to a nominal location of said edge to subsequently determine an actual location of said edge within said scanning zone.

8. The process defined in claim 1 wherein at least a width of the surface zones of the linear array of liquid crystal light modulators as seen in the direction of movement of the material web is adjustable, and the surface zones are adjustable from a narrow setting during an initial edge locating run to a broader setting for the measurement zone, which has a limited length.

9. Process defined in claim 1 wherein said signal is evaluated optionally as a digital or as an analog signal, in a digital scanning mode, the signals generated by the photocell being formed as voltage values exceeding a minimum threshold voltage, and in an analog scanning mode, the signals being formed as voltage values representing measured quantities of light.

10. A photoelectronic scanning device for determining a location of at least one edge of a moving web within a measurement zone extending transversely to a direction of movement of said web, said device comprising:

a light source and a light-collecting receiver having at least one photocell and disposed on opposite sides of said web so that said web partially intercepts light passing from said source in the direction of said receiver and said edge lies in said zone, said light source and said light-collecting receiver extending over a scanning zone extending at a right angle to said direction of movement and said edge;

a band-shaped linear array of liquid-crystal light modulators, which are nontransparent to light except for an electronically activated surface zone formed by selective electronic activation, and which is disposed between said source and said receiver across said scanning zone; and a control circuit connected to said modulators for electronically and sequentially activating at least one series of surface zones thereof from a nontransparent normal state into a transparent state, thereby scanning a transparent surface zone across said measurement zone and generating at least one signal when light traversing said transparent surface zone first falls on said receiver or falls on said receiver for a last time upon at said edge in each travel of said surface zone across said measurement zone, whereby a location of said surface zone within said measurement zone at an instant of said signal is determined as the location of said edge.

11. The device defined in claim 10 wherein said control circuit is connected to a determining circuit in which a location of an activated surface zone within the measurement zone is determined with a signal of the photocell.

12. The device defined in claim 10 wherein the array of liquid crystal light modulators is band-shaped and that each surface zone that can be activated is at least one pixel of the liquid crystal light modulators.

13. The device defined in claim 12 wherein said surface zones in a field of view of the light crystal light modulators are bar-shaped, rectangular or round segments.

14. The device defined in claim 12 wherein said measurement zone is adjustable within the scanning zone by limiting the number of the surface zones to be activated.

15. The device defined in claim 12 wherein a location of said measurement zone within a scanning zone is adjustable cyclically.

16. The device defined in claim 12, further comprising means for switchover between a digital and analog scanning mode.

17. The device defined in claim 12 wherein said light source is a broad-band light source at one side of the web and the receiver is a body made of light-collecting plastic painted with a fluorescent paint or a band-shaped parabolic mirror at an opposite side of the web.

18. The device defined in claim 17 wherein said liquid crystal light modulators are mounted on said body or on an entry opening of said parabolic mirror.

19. The device defined in claim 17 wherein a plurality of photocells arranged at spaced locations over the scanning zone are arranged on a light exit surface of said body.

20. The device defined in claim 12 wherein a speed of succession and a number of activation cycles of said surface zones, as seen in the direction of measurement, are adjustable.

21. The device defined in claim 12 wherein the determining circuit is connected to a web travel correction device.

* * * * *